United States Patent [19]

Jacobs

[11] 4,172,493
[45] Oct. 30, 1979

[54] TEMPERATURE CONTROL SYSTEM

[75] Inventor: Clifford A. Jacobs, Sarisbury Green, England

[73] Assignee: Petters Limited, Hamble, England

[21] Appl. No.: 756,388

[22] Filed: Jan. 3, 1977

[30] Foreign Application Priority Data

Jan. 2, 1976 [GB] United Kingdom .................... 41/76

[51] Int. Cl.² .................. F25D 11/12; B61D 27/00; F25B 29/00
[52] U.S. Cl. ........................................ 165/42; 62/82; 165/43; 165/64
[58] Field of Search ................. 165/42, 43, 81, 64, 165/17, 29; 62/81, 82, 91

[56] References Cited
U.S. PATENT DOCUMENTS

| | | |
|---|---|---|
| 2,952,138 | 9/1960 | Russell et al. .................... 165/43 X |
| 3,195,321 | 7/1965 | Decker et al. .......................... 62/81 |
| 3,219,102 | 11/1965 | Taylor ................... 62/81 X |
| 3,277,956 | 10/1966 | Hughes et al. ......................... 165/64 |
| 3,343,375 | 9/1967 | Quick ......................... 62/81 |
| 3,494,413 | 2/1970 | Dixon .................... 165/43 |

Primary Examiner—Charles J. Myhre
Assistant Examiner—Theophil W. Streule, Jr.
Attorney, Agent, or Firm—Wigman & Cohen

[57] ABSTRACT

In a temperature control system for container vehicles, a refrigerant circuit has the customary compressor, condenser, expansion valve and evaporator. The compressor and condenser are together in one module while the expansion valve and evaporator are together in another module. The compressor is hydraulically driven. Heat for temperature control purposes can be obtained from the energy of the hydraulic fluid by means of a restrictor in the hydraulic fluid circuit.

15 Claims, 12 Drawing Figures

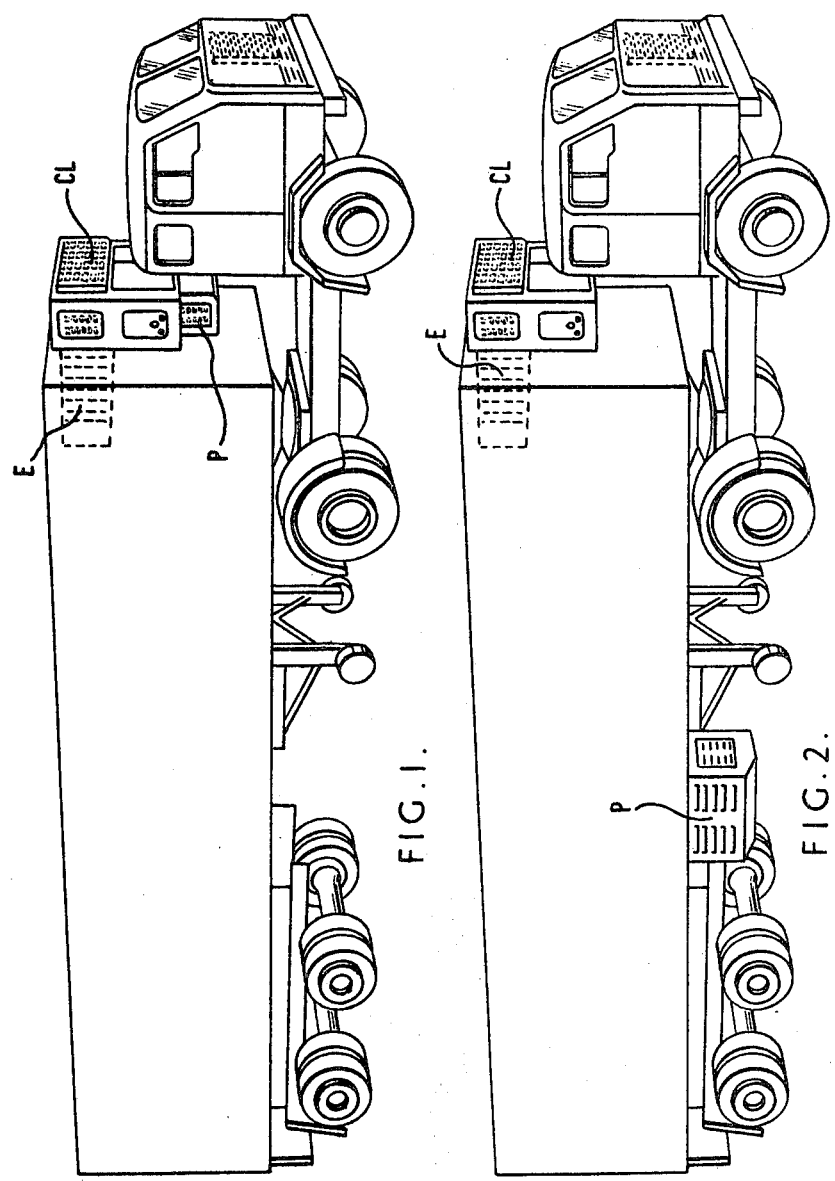

FIG. II.

TEMPERATURE CONTROL SYSTEM

BACKGROUND OF THE INVENTION

This invention relates to a temperature control system, particularly but not solely a transport temperature control system.

SUMMARY

According to a first aspect of the invention, there is provided a temperature control system adapted for selectively heating or cooling an enclosed space, comprising a refrigerant circuit and an hydraulic fluid circuit, the refrigerant circuit comprising an hydraulically-driven compressor, a condenser, an expansion valve and an evaporator, the hydraulic fluid circuit having first and second sub-circuits, the first sub-circuit being adapted for driving the compressor, the second sub-circuit including a restrictor for converting the pressure energy of the hydraulic fluid into heat and including a heat exchanger for transferring the heat to the enclosed space, and means for controlling the flow of hydraulic fluid in the two sub-circuits.

The second sub-circuit may be adapted to conduct the hydraulic fluid as a heating medium to and from the enclosed space, with the heat exchanger arranged in or adjacent the enclosed space.

Alternatively, the heat exchanger may be adapted to transfer the heat to an intermediate gaseous or liquid heating medium (which may or may not be the refrigerant) in a closed circuit including a second heat exchanger arranged in or adjacent the enclosed space.

Preferably the said evaporator is in unit with the above-mentioned heat exchanger which is in or adjacent the enclosed space.

Preferably the two sub-circuits are in parallel with each other.

Preferably the compressor and the condenser are together in one module whilst the expansion valve and the evaporator are together in another module. The two modules may be located together or apart.

According to a second aspect of the invention there is provided a temperature control system comprising at least a condenser module and an evaporator module connected together or adapted to be connected together in a refrigerant circuit, the condenser module including an hydraulically-driven compressor and a condenser, the evaporator module including an expansion valve and an evaporator, the two modules being adapted to be capable of being located selectively either directly adjacent each other or spaced apart.

The system according to the second aspect of the invention may optionally also comprise a power module comprising a prime mover and an hydraulic pump, the power module being adapted to be capable of being located selectively either directly adjacent the condenser module or spaced apart from the condenser module.

The ability to locate the modules selectively either together, that is, directly adjacent each other, or spaced apart provides flexibility in the layout of the system. For example, a road vehicle equipped with a system according to the second aspect of the invention may have the modules spaced apart to improve weight distribution. Also, modular construction enables one to reduce the number of different parts required to suit different applications.

The condenser module may include an auxiliary prime mover, for example, an electric motor.

BRIEF DESCRIPTION OF THE DRAWINGS

FIGS. 1 to 8 respectively illustrate eight different road vehicles each incorporating a transport temperature control system embodying both aspects of the invention;

DESCRIPTION OF THE PREFERRED EMBODIMENTS

Figure 3:
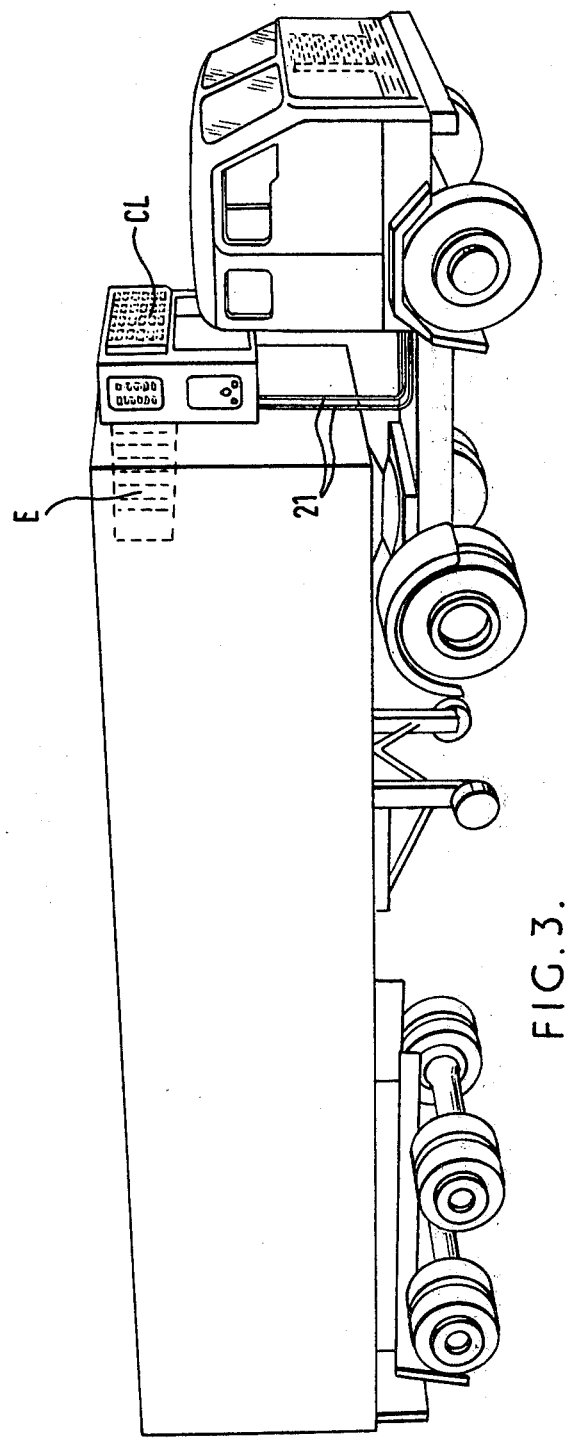

Referring to the drawings, each of the temperature control systems illustrated in FIGS. 1 to 11 comprises either a long condenser module CL or a wide condenser module CW and also comprises an evaporator module E. The temperature control systems illustrated in FIGS. 1, 2, 4, 5, 8, 9 and 10 also each comprise a power module P.

Figure 11:
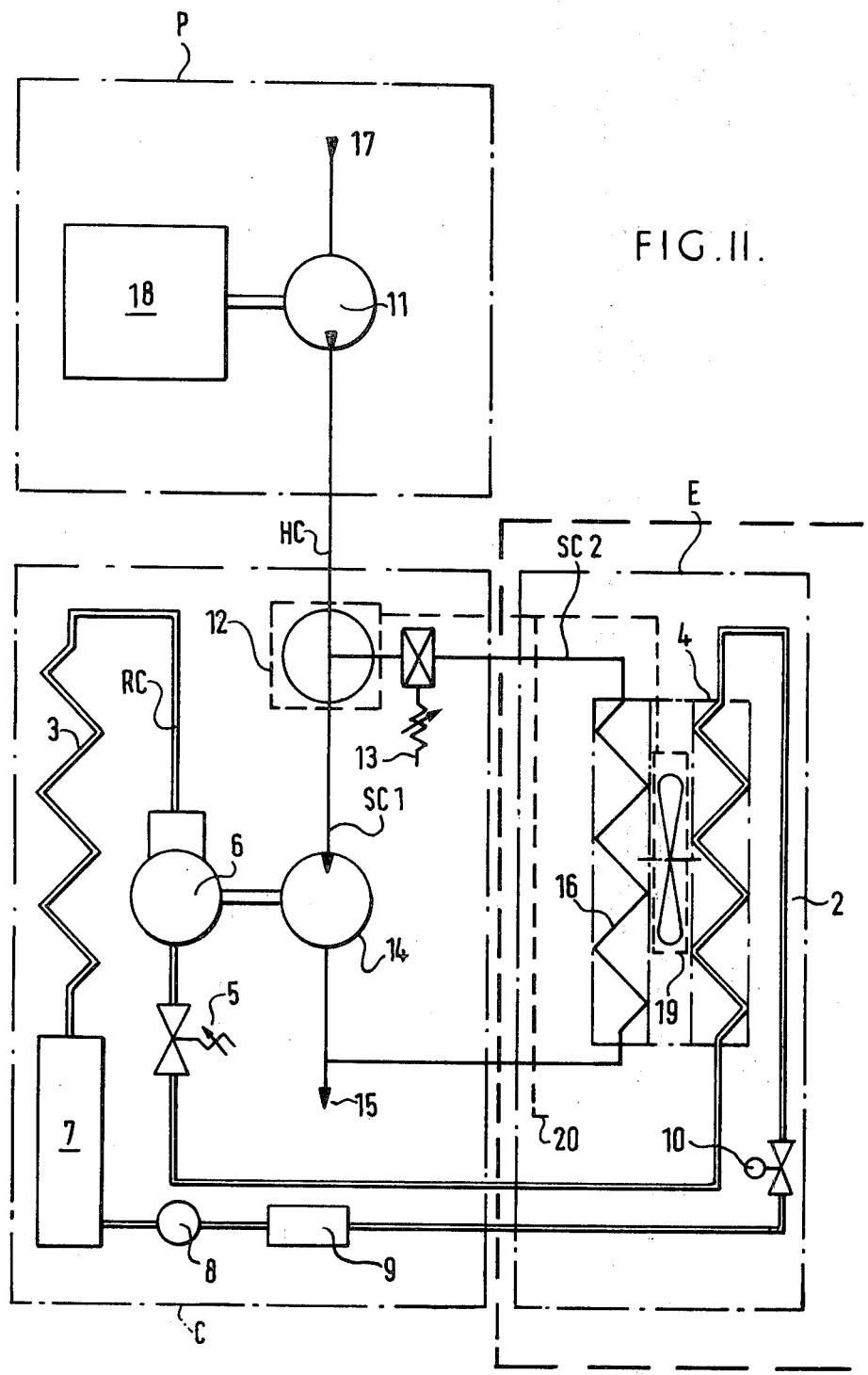
FIG. 11 is a diagram of the refrigerant circuit and the hydraulic fluid circuit in each of the three-module systems illustrated in FIGS. 1 to 10, that is to say, the arrangements shown in FIGS. 1, 2, 4, 5, 8, 9 and 10.

Referring particularly to FIG. 11, in which the component parts are shown of the condenser module CL or CW, (indicated by "C"), the evaporator module E and the power module P, the component parts are as follows:

3. Condensing heat exchanger
4. Cooling heat exchanger
5. Suction limiting valve
6. Refrigerant compressor
7. Refrigerant receiver
8. Sight glass
9. Dehydrator
10. Thermal expansion valve with sensing bulb
11. Hydraulic pump
12. Follow controlling diverter valve
13. Restrictor
14. Hydraulic
15. Low pressure hydraulic fluid discharge
16. Heating/Defrosting heat exchanger
17. Low pressure hydraulic fluid source
18. Prime mover
19. Fan
20. Control unit Referring to FIG. 11, the power module P comprises the hydraulic pump 11, the low pressure hydraulic fluid source 17 and the prime mover 18. The prime mover 18 is adapted to drive the hydraulic pump 11, which receives hydraulic fluid from the source 17. The prime mover 18 is either adapted to drive the pump 11 at a fixed speed or adapted to drive it at a variable speed.

The condenser module C comprises the condensing heat exchanger 3, the suction limiting valve 5, the refrigerant compressor 6, the refrigerant receiver 7, the sight glass 8, the dehydrator 9, the flow controlling diverter valve 12, the restrictor 13, the hydraulic motor 14 and the low pressure hydraulic fluid discharge 15.

The evaporator module E, which is located within a space 2 of which the temperature is controlled by the system, comprises the cooling heat exchanger 4, the thermal expansion valve 10 with sensing bulb, the heating/defrosting heat exchanger 16, the fan 19 and the control unit 20. The fan 19 is preferably hydraulically driven but could be otherwise powered.

In the hydraulic circuit HC of the system, hydraulic fluid from the pump 11 passes to the valve 12, which is controlled by the control unit 20 to pass the hydraulic fluid either to a first sub-circuit SC1 or to a second sub-circuit SC2 or in controlled proportions to both sub-circuits SC1 and SC2. In the first sub-circuit SC1, the hydraulic fluid drives the hydraulic motor 14 and passes thence to the discharge 15. In the second sub-circuit SC2, the hydraulic fluid passes through the restrictor 13 to the heating/defrosting heat exchanger 16, (which includes a heating "coil" as shown,) and thence to the discharge 15. It will be appreciated that the first and second sub-circuits SC1 and SC2 are in parallel with each other.

In the refrigerant circuit RC, the refrigerant compressor 6, which is driven by the hydraulic motor 14, pumps refrigerant through the condensing heat exchanger 3 and into the refrigerant receiver 7. From there, it passes through the sight glass 8 and the dehydrator 9, and then through the thermal expansion valve 10 into the cooling heat exchanger 4, whence it passes through the (controllable) suction limiting valve 5 back to the compressor 6.

To provide a heating or defrosting function, hydraulic fluid or oil which would normally drive the hydraulic motor 14, and hence the compressor 6, is diverted by the valve 12 through the restrictor 13 and the heating/defrosting heat exchanger 16, which is in unit with the cooling heat exchanger 4. The valve 12 is controlled so as to achieve this by means of the control unit 20. The heat given out by the heat exchanger 16 is dissipated in defrosting the heat exchanger 4, or in heating the conditioned space 2, according to whether or not the fan 19 is stalled or stopped or not by means of the control unit 20.

To provide a capacity-controlled refrigeration function, only some of the hydraulic fluid or oil from the pump 11 is passed by the valve 12 to the hydraulic motor 14 to drive the compressor 6. The remainder of the hydraulic fluid is diverted by the valve 12 through the restrictor 13 and the heating/defrosting heat exchanger 16. Hence, the speed of the compressor 6 is less than if all the hydraulic fluid from pump 11 were driving the motor 14. Furthermore, heat from the diverted hydraulic fluid in sub-circuit SC2 is dissipated by the heating/defrosting heat exchanger 16, thus offsetting the cooling effect of the heat exchanger 4.

The valve 12 may be operable manually and/or automatically to change from the heating or defrost function to the capacity-controlled compression refrigeration function. The heating function may be intermittently employed during refrigeration to defrost the cooling heat exchanger 4 as and when required. The fan 19 is stalled or stopped if it is desired to defrost the cooling heat exchanger 4 without simultaneously heating the conditioned space 2. Otherwise, the fan 19 is run to bring the air from the conditioned space 2 into contact with the two heat exchangers 4 and 16.

The capacity-controlled refrigeration function may be usefully employed in the carriage of perishable cargoes for which extremes of air temperature should be avoided.

The effect of the restrictor 13 is to convert the energy of the hydraulic fluid from pressure into heat. The restrictor 13 is shown as controllable to vary the heating effect of the hydraulic fluid. However, it could alternatively be set to have a fixed restriction.

It will be appreciated that the heating/defrosting function (by means of the hydraulic fluid in sub-circuit SC2,) can be achieved without operating the refrigerant compressor 6 and may be adjusted to suit the loading requirement by adjustment of the restrictor 13. It will also be appreciated that the system does not involve the use of any high voltage electrical device within the conditioned space 2.

Furthermore, no belt drive or electrical power generation is involved in the system of FIG. 11, which is therefore inherently safe to operate under adverse conditions.

If the prime mover 18 is fixed speed, the speed of the refrigerant compressor 6 may be changed by exchanging the hydraulic pump 11 and/or the hydraulic motor 14.

Figure 10:
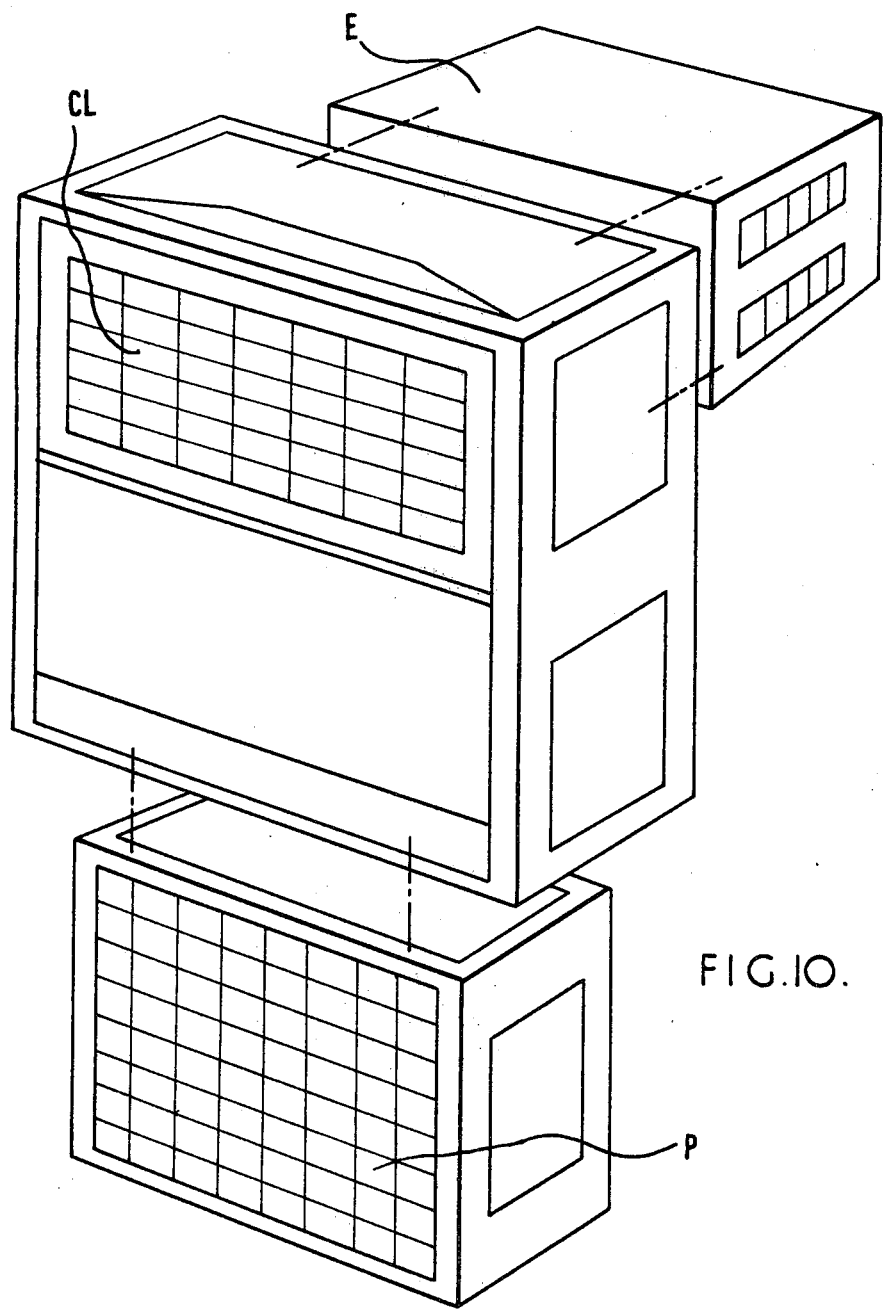

The modules E and CL or CW and, optionally, the module P, may either be bolted together to form an integrated unit or be spaced apart, according to requirements. FIGS. 1 and 10 illustrate an arrangement such that the evaporator module E, the long condenser module CL and the power module P are bolted together as shown in a trailer vehicle or container, with the evaporator module E behind the condenser module CL and with the power module P beneath the condenser module CL. The evaporator module E is illustrated by broken lines because it is inside the goods compartment of the vehicle. The modules CL and P are mounted on the front of the goods compartment as shown.

The arrangement illustrated in FIG. 2 differs from that of FIG. 1 only in that the power module is mounted remotely from the other two modules, being mounted underneath the goods compartment of the vehicle. This achieves better weight distribution, and also reduces the height of the structure mounted on the front of the goods compartment, that is to say, reducing it to the height of the condenser module CL alone, instead of the combination of the condenser module CL and power module P. The arrangement of FIG. 2 may also be more convenient in the case of a low vehicle, i.e. lower than that illustrated.

In the arrangement illustrated in FIG. 3, there is no power module, but only an evaporator module E and condenser module CL, mounted in the same way as in FIG. 2. Hydraulic power to the condenser module CL is via conduits 21 leading to and from an hydraulic pump (not shown) driven directly by the engine or transmission of the vehicle.

Figure 4:
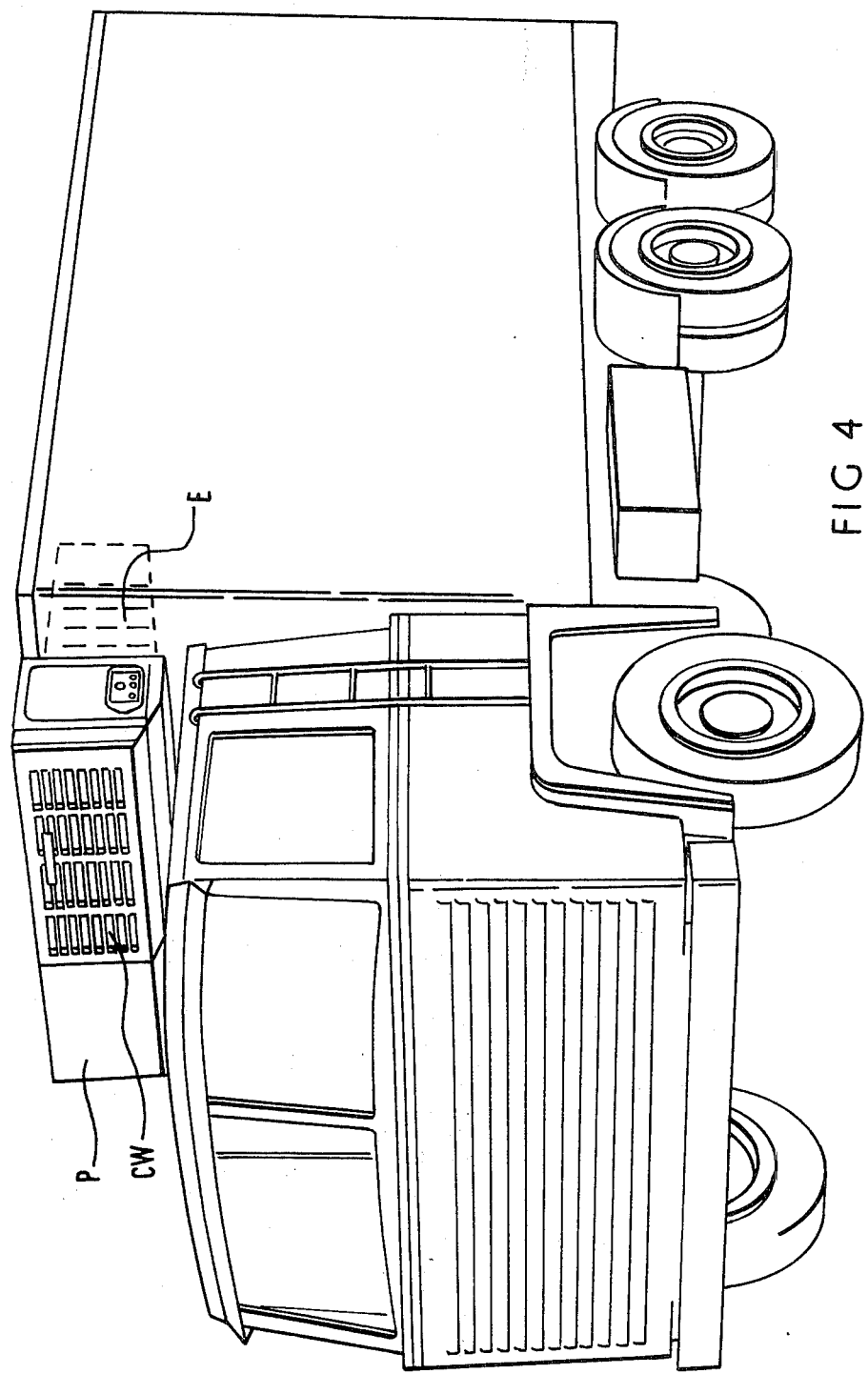
Figure 9:
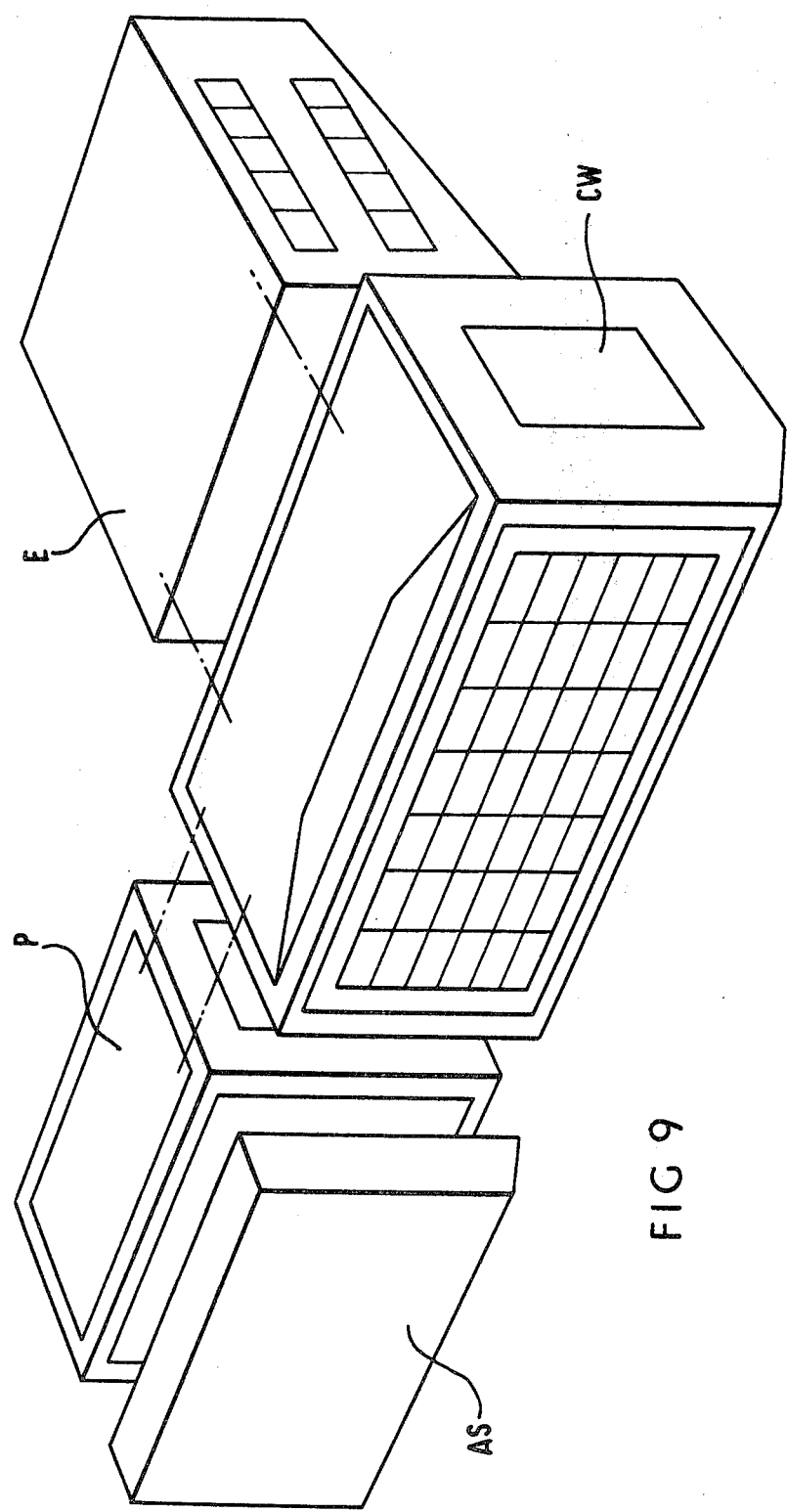
FIGS. 9 and 10 illustrate two different arrangements of the modules in some of the vehicles of FIGS. 1 to 7.

In the arrangement illustrated in FIGS. 4 and 9, the wide condenser module CW replaces the long condenser module CL of FIGS. 1 to 3 and 10. The condenser module CW, the evaporator module E and the power module P are bolted together as an integrated unit in the manner shown, with the evaporator module E behind the condenser module CW, and with the power module P beside the condenser module CW. The power module P includes an acoustic screen AS at the front of the power module P. Obviously, such a screen could equally well be used in the other arrangements. The vehicle shown in FIG. 4 is a so-called "rigid" vehicle, the integrated unit of the three modules being mounted over the cab of the vehicle.

Figure 5:
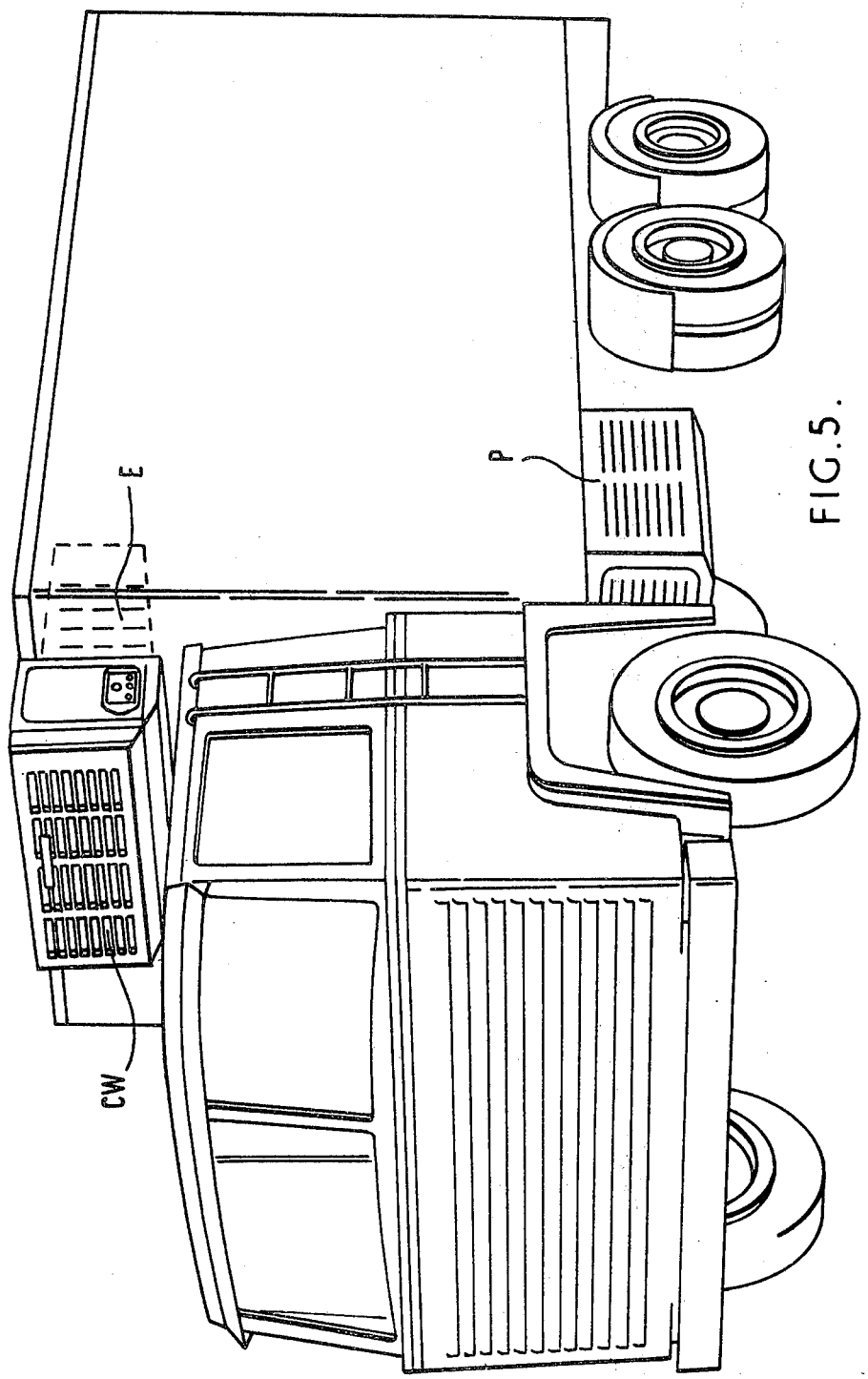

In the arrangement of FIG. 5, the power module P has been moved to a position underneath the goods compartment, as compared with the arrangement of FIG. 4, thereby improving the weight distribution and reducing the width of the structure mounted on the front of the goods compartment.

Figure 6:
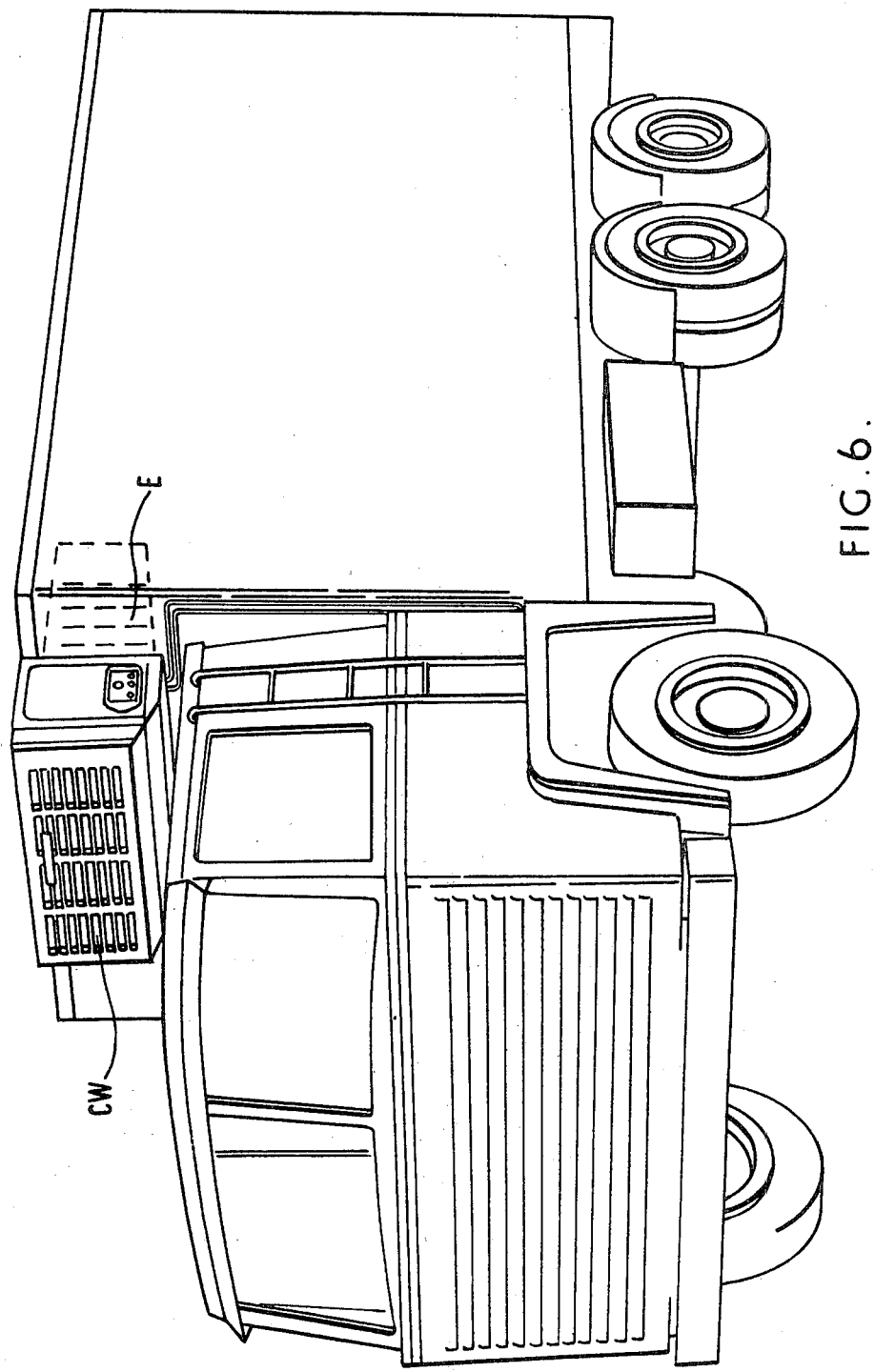

In the arrangement of FIG. 6, the power module is dispensed with and the condenser module CW is hydraulically powered (by means not shown) from an hydraulic pump driven directly by the engine or transmission of the vehicle, so that the arrangement of FIG. 6 is equivalent to that of FIG. 3 in the same way as the arrangements of FIGS. 4 and 5 are equivalent to the arrangements of FIGS. 1 and 2 respectively.

Figure 7:
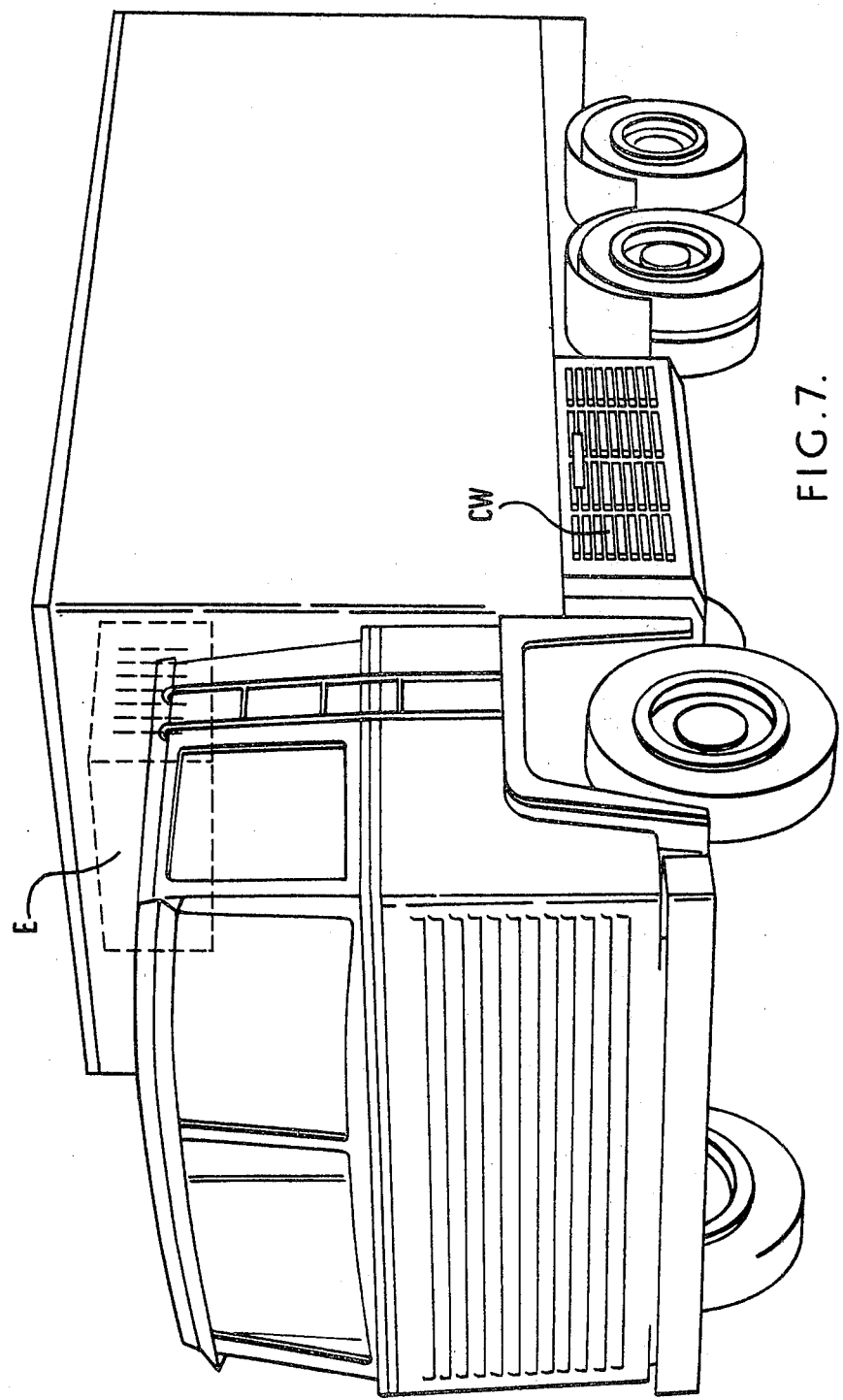

In the arrangement of FIG. 7, the wide condenser module CW is not mounted over the cab, but instead is mounted underneath the goods compartment of the vehicle, so that it is spaced apart from the evaporator module E, which is mounted inside the goods compartment in the same place as in FIGS. 4 to 6. There is no power module in this arrangement, the condenser module CW being hydraulically powered from an hydraulic pump (not shown) driven directly by the engine or transmission of the vehicle, just as in FIGS. 3 and 6. It will be appreciated that this arrangement is suitable for a vehicle having a high cab.

Figure 8:
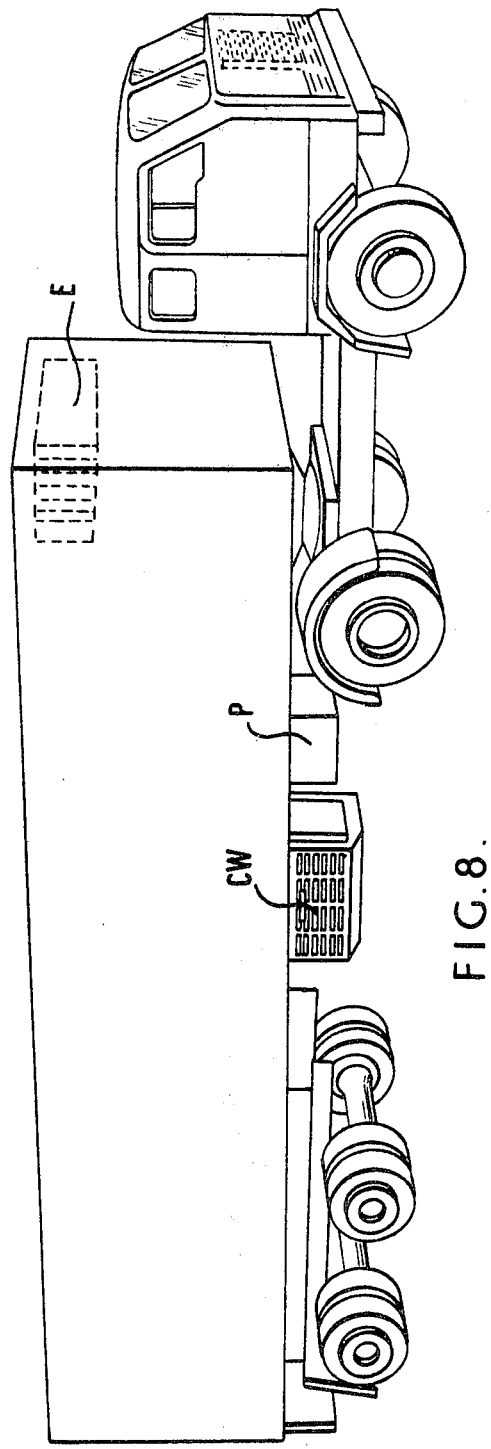

In the arrangement of FIG. 8, the wide condenser module CW and the power module P are mounted spaced apart from each other underneath the goods compartment which in this case is a trailer as in FIGS. 1 to 3, for good weight distribution. This arrangement is also useful in cases where there is insufficient space to mount any of the modules on the front of the trailer. The evaporator module E is in the same place as in FIGS. 1 to 3.

Figure 12:
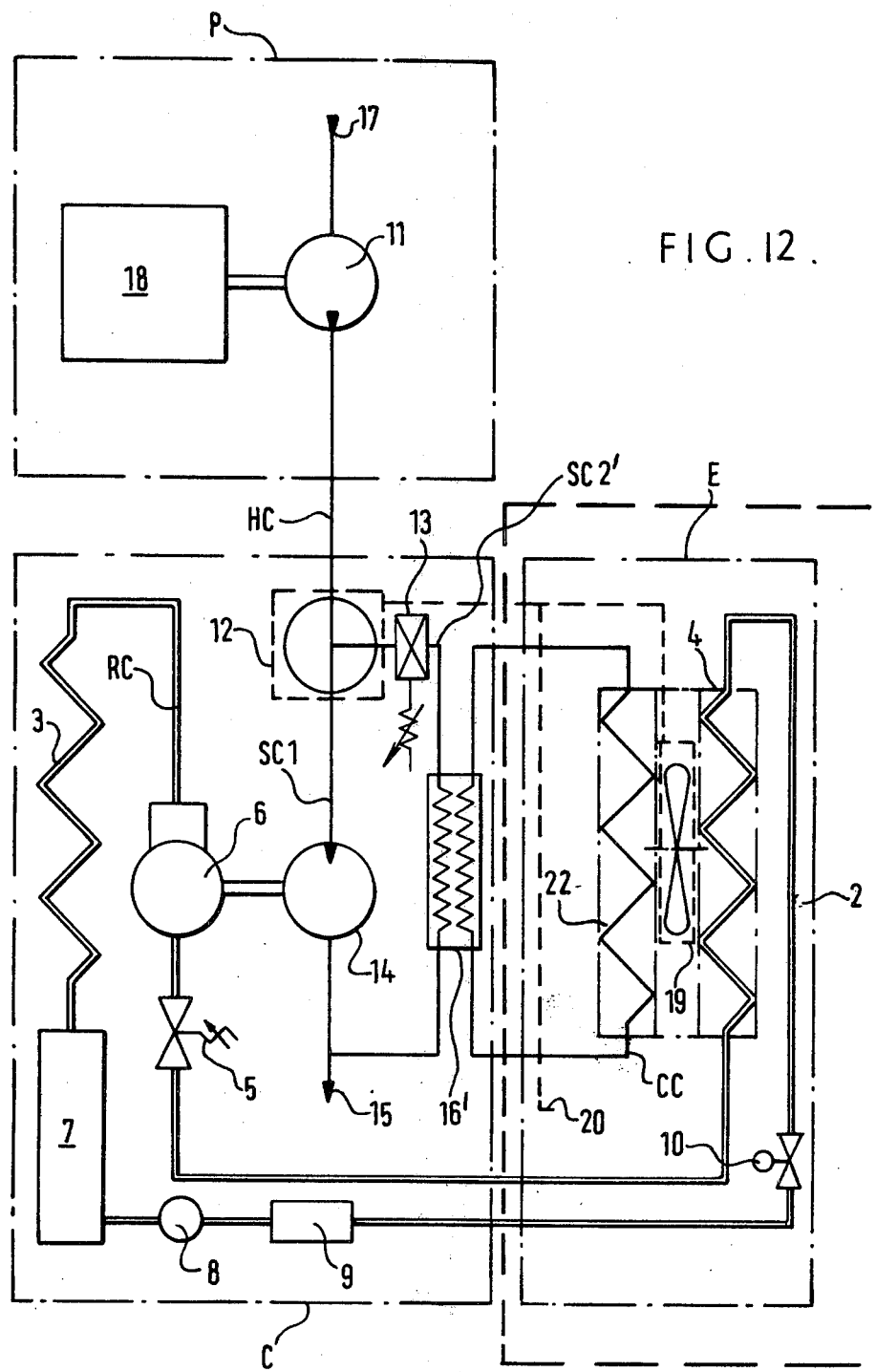
FIG. 12 is a diagram of a modification to the arrangement shown in FIG. 11.

Referring to FIG. 12, the above-described apparatus may be modified so that a modified heat exchanger 16' in second sub-circuit SC2' is adapted to transfer the heat to an intermediate gaseous or liquid heating medium (which may or may not be the refrigerant) in a closed circuit CC including a second heat exchanger 22 arranged in or adjacent the enclosed space 2.

It will be appreciated from the above description and from the drawings that the modular construction of the temperature control system enables it to be adapted to a wide variety of vehicles, including indeed not only road vehicles but also rail and air vehicles, or a "container", or a hold of a ship, or even a caravan.

Further mechanical auxiliaries may be driven by additional units in the hydraulic circuit or coupled to the existing units, for instance, a low voltage electrical generator for control circuits.

I claim:

1. A temperature control system adapted for selectively heating and cooling an enclosed space, comprising a refrigerant circuit and an hydraulic fluid circuit, the refrigerant circuit comprising an hydraulically-driven compressor, a condenser, an expansion valve and an evaporator, the evaporator being arranged in heat exchange relation with the enclosed space, the hydraulic fluid circuit having first and second sub-circuits, the first sub-circuit including means drivingly connected to the compressor for driving the compressor, the second sub-circuit including restrictor means for converting the pressure energy of the hydraulic fluid into heat, said second sub-circuit further including heat exchanger means in heat exchange relation with the enclosed space for transferring the heat to the enclosed space, and means for controlling the flow of hydraulic fluid in the two sub-circuits.

2. A system as claimed in claim 1, wherein the second sub-circuit is adapted to conduct the hydraulic fluid as a heating medium to and from the enclosed space, with the heat exchanger means arranged in or adjacent the enclosed space.

3. A system as claimed in claim 1, wherein the heat exchanger means is adapted to transfer the heat to an intermediate fluid heating medium in a closed circuit including a second heat exchanger means arranged in or adjacent the enclosed space.

4. A system as claimed in claim 3, wherein the intermediate heating medium is the refrigerant.

5. A system as claimed in claim 2, wherein the said evaporator is in unit with the heat exchanger means which is in or adjacent the enclosed space.

6. A system as claimed in claim 1, wherein the two sub-circuits are in parallel with each other.

7. A system as claimed in claim 1, wherein the compressor and the condenser are arranged together in a first module and the expansion valve and the evaporator are arranged together in a second module.

8. A system as claimed in claim 7, wherein the two modules are located together.

9. A system as claimed in claim 7, wherein the two modules are located apart.

10. A temperature control system adapted for selectively heating or cooling an enclosed space, comprising a refrigerant circuit and an hydraulic fluid circuit, the refrigerant circuit comprising an hydraulically-driven compressor, a condenser, an expansion valve and an evaporator, the evaporator being arranged in heat exchange relation with the enclosed space, the hydraulic fluid circuit having first and second sub-circuits, the first sub-circuit including means for driving the compressor, the second sub-circuit including restrictor means for converting the pressure energy of the hydraulic fluid into heat, said second sub-circuit further including heat exchanger means for transferring the heat to the enclosed space, and means for controlling the flow of hydraulic fluid in the two sub-circuits, the two sub-circuits being arranged in parallel with each other, the compressor and condenser being arranged together in a first module and the expansion valve and the evaporator being arranged together in a second module.

11. A system as claimed in claim 10, wherein the second sub-circuit is adapted to conduct the hydraulic fluid as a heating medium to and from the enclosed space, with the heat exchanger means arranged in or adjacent the enclosed space.

12. A system as claimed in claim 10, wherein the heat exchanger means is adapted to transfer the heat to an intermediate gaseous or liquid heating medium in a closed circuit including a second heat exchanger means arranged in or adjacent the enclosed space.

13. A system as claimed in claim 12, wherein the intermediate heating medium is the refrigerant.

14. A system as claimed in claim 11, wherein the said evaporator is in unit with the heat exchanger means.

15. A system as claimed in claim 12, wherein the said evaporator is in unit with the said second heat exchanger means.

* * * * *

UNITED STATES PATENT AND TRADEMARK OFFICE
CERTIFICATE OF CORRECTION

PATENT NO. : 4,172,493
DATED : October 30, 1979
INVENTOR(S) : Clifford A. Jacobs It is certified that error appears in the above-identified patent and that said Letters Patent are hereby corrected as shown below:

Column 2, line 42, change "Follow" to --Flow--; and line 44, after "Hydraulic" insert --motor--.

Claim 12, line 55, delete "gaseous or liquid" and substitute therefor --fluid--.

Signed and Sealed this

Twenty-fifth Day of March 1980

[SEAL]

Attest:

SIDNEY A. DIAMOND

Attesting Officer

Commissioner of Patents and Trademarks